US006615180B1

(12) United States Patent
Anderton et al.

(10) Patent No.: US 6,615,180 B1
(45) Date of Patent: Sep. 2, 2003

(54) PROCESS AND APPARATUS FOR THE DERIVATION OF ANNUITY RATES

(75) Inventors: William Nicholas Anderton, deceased, late of Guildford (GB), by David G. Peter, executor; Christopher Rostron, Wimborne (GB)

(73) Assignee: Impaired Life Services Limited, Dorset (GB)

( * ) Notice: Subject to any disclaimer, the term of this patent is extended or adjusted under 35 U.S.C. 154(b) by 0 days.

(21) Appl. No.: 09/272,286

(22) Filed: Mar. 19, 1999

Related U.S. Application Data

(63) Continuation-in-part of application No. 08/847,106, filed on May 1, 1997.

(51) Int. Cl.[7] ............................................... G06F 17/60
(52) U.S. Cl. ......................................................... 705/4
(58) Field of Search ............................ 705/1–6, 35, 38

(56) References Cited

U.S. PATENT DOCUMENTS

| | | | | |
|---|---|---|---|---|
| 4,975,840 A | | 12/1990 | DeTore et al. ............. 364/401 |
| 5,655,085 A | | 8/1997 | Ryan et al. ................ 364/401 |
| 5,752,236 A | * | 5/1998 | Sexton et al. ................. 705/4 |
| 5,754,980 A | * | 5/1998 | Anderson et al. ............. 705/4 |
| 5,761,645 A | | 6/1998 | Hawkins ....................... 705/4 |
| 5,819,230 A | * | 10/1998 | Christie et al. ............... 705/4 |
| 5,893,071 A | * | 4/1999 | Cooperstein .................. 705/4 |
| 5,930,760 A | * | 7/1999 | Anderton et al. ............. 705/4 |
| 5,956,691 A | * | 9/1999 | Powers ......................... 705/4 |
| 6,041,304 A | * | 3/2000 | Meyer et al. ................. 705/4 |
| 6,064,969 A | * | 5/2000 | Haskins ........................ 705/4 |

OTHER PUBLICATIONS

Bragg, John M. "New Mortality Table Shows Up on Annuity Block," National Underwriter. Jan. 20, 1997. p. 8.*
"Association of British Insurers: Insurance Companies Recognise Need to Reflect Increased Life Expectancy," M2 Presswire. May 28, 1998. p. 1.*
Shaw, Irv. "Prospecting in the Impaired Risk Market," Broker World. Nov. 1996. p. 12.*
O'Connell, Sandra E. "Software to Assist Your Retirees," HR Magazine. Aug. 1, 1994. p. 43.*

* cited by examiner

*Primary Examiner*—Sam Rimell
(74) *Attorney, Agent, or Firm*—Roberts Abokhair & Mardula, LLC

(57) ABSTRACT

A process and apparatus for determining premium tables to produce annuity rates, where the annuity rates reflect client data pertaining to age, sex, medical conditions and high risk behavior. The annuity rate reflects potential medical and social advancement, prudence, interest, expenses, and commissions as well as other related factors in determining premiums to be paid by individuals.

24 Claims, 6 Drawing Sheets

MALES

RATING CATEGORY

| MPLE AGE AT ENTRY | A1<br><2 | A2<br>3 - 5 | B<br>6 - 10 | C<br>11 - 15 | D<br>16 - 20 |
|---|---|---|---|---|---|
| 45 | 681.312 | 365.969 | 200.998 | 135.127 | 98.505 |
| 46 | 680.958 | 365.508 | 200.286 | 134.203 | 97.366 |
| 47 | 680.541 | 364.969 | 199.468 | 133.202 | 96.128 |
| 48 | 680.052 | 364.340 | 198.535 | 132.118 | 94.785 |
| 49 | 679.479 | 363.612 | 197.528 | 130.947 | 93.328 |
| 50 | 678.812 | 362.771 | 196.449 | 129.682 | 91.750 |
| 51 | 678.039 | 361.809 | 195.296 | 128.319 | 90.043 |
| 52 | 677.149 | 360.714 | 194.066 | 126.851 | 88.196 |
| 53 | 676.130 | 359.479 | 192.757 | 125.273 | 86.202 |
| 54 | 674.974 | 358.195 | 191.366 | 123.577 | 84.049 |
| 55 | 673.671 | 356.879 | 189.892 | 121.757 | 81.726 |
| 56 | 672.216 | 355.536 | 188.330 | 119.805 | 79.223 |
| 57 | 670.853 | 354.171 | 186.677 | 117.712 | 76.525 |
| 58 | 669.631 | 352.789 | 184.929 | 115.468 | 73.620 |
| 59 | 668.325 | 351.292 | 183.030 | 113.031 | 70.467 |
| 60 | 666.902 | 349.661 | 180.961 | 110.380 | 67.044 |

FIGURE 3

MALES

RATING CATEGORY

| MPLE AGE AT ENTRY | A1<br><2 | A2<br>3 - 5 | B<br>6 - 10 | C<br>11 - 15 | D<br>16 - 20 |
|---|---|---|---|---|---|
| 45 | 579.115 | 292.775 | 150.748 | 87.832 | 44.327 |
| 46 | 578.814 | 292.406 | 150.214 | 87.232 | 43.815 |
| 47 | 578.460 | 291.975 | 149.601 | 86.581 | 43.258 |
| 48 | 578.044 | 291.472 | 148.902 | 85.877 | 42.653 |
| 49 | 577.557 | 290.889 | 148.146 | 85.116 | 41.998 |
| 50 | 576.990 | 290.217 | 147.337 | 84.294 | 41.288 |
| 51 | 576.333 | 289.447 | 146.472 | 83.407 | 40.519 |
| 52 | 575.577 | 288.572 | 145.549 | 82.453 | 39.688 |
| 53 | 574.711 | 287.583 | 144.567 | 81.427 | 38.791 |
| 54 | 573.728 | 286.556 | 143.525 | 80.325 | 37.822 |
| 55 | 572.621 | 285.503 | 142.419 | 79.142 | 36.777 |
| 56 | 571.384 | 284.429 | 141.247 | 77.873 | 35.650 |
| 57 | 570.225 | 283.337 | 140.008 | 76.513 | 34.436 |
| 58 | 569.186 | 282.231 | 138.697 | 75.054 | 33.129 |
| 59 | 568.076 | 281.034 | 137.272 | 73.470 | 31.710 |
| 60 | 566.866 | 279.728 | 135.721 | 71.747 | 30.170 |

FIGURE 4

| AGE | A1 | A2 | B | C | D |
|---|---|---|---|---|---|
| 45 | 12.317 | 28.296 | 150.748 | 87.832 | 44.327 |
| 46 | 12.231 | 28.308 | 150.214 | 87.232 | 43.815 |
| 47 | 12.325 | 28.321 | 149.601 | 86.581 | 43.258 |
| 48 | 12.33 | 28.336 | 148.902 | 85.877 | 42.653 |
| 49 | 12.336 | 290.889 | 148.146 | 85.116 | 41.998 |
| 50 | 12.342 | 290.217 | 147.337 | 84.294 | 41.288 |
| 51 | 12.349 | 289.447 | 146.472 | 83.407 | 40.519 |
| 52 | 12.358 | 288.572 | 145.549 | 82.453 | 39.688 |
| 53 | 12.367 | 287.583 | 144.567 | 81.427 | 38.791 |
| 54 | 12.376 | 286.556 | 143.525 | 80.325 | 37.822 |
| 55 | 12.387 | 285.503 | 142.419 | 79.142 | 36.777 |
| 56 | 12.397 | 284.429 | 141.247 | 77.873 | 35.650 |
| 57 | 12.403 | 283.337 | 140.008 | 76.513 | 34.436 |
| 58 | 12.397 | 282.231 | 138.697 | 75.054 | 33.129 |
| 59 | 12.391 | 281.034 | 137.272 | 73.470 | 31.710 |
| 60 | 12.385 | 279.728 | 135.721 | 71.747 | 30.170 |
| 61 | 12.382 | | | | |
| 62 | 12.388 | | | | |
| 63 | 12.396 | | | | |
| 64 | 12.405 | | | | |
| 65 | 12.414 | | | | |
| 66 | 12.424 | | | | |
| 67 | 12.435 | | | | |
| 68 | 12.446 | | | | |
| 69 | 12.459 | | | | |
| 70 | 12.472 | | | | |

FIGURE 5

| AGE | A1 | A2 | B | C | D |
|---|---|---|---|---|---|
| 45 | 50.875 | 54.264 | 66.371 | 82.502 | 105.330 |
| 46 | 50.875 | 54.265 | 66.385 | 82.515 | 105.194 |
| 47 | 50.875 | 54.266 | 66.402 | 82.521 | 105.041 |
| 48 | 50.875 | 54.268 | 66.421 | 82.520 | 104.869 |
| 49 | 50.875 | 54.270 | 66.437 | 82.510 | 104.675 |
| 50 | 50.875 | 54.272 | 66.448 | 82.491 | 104.461 |
| 51 | 50.875 | 54.275 | 66.453 | 82.463 | 104.226 |
| 52 | 50.875 | 54.277 | 66.451 | 82.424 | 103.970 |
| 53 | 50.875 | 54.281 | 66.444 | 82.375 | 103.693 |
| 54 | 50.875 | 54.281 | 66.429 | 82.317 | 103.398 |
| 55 | 50.876 | 54.279 | 66.408 | 82.252 | 103.087 |
| 56 | 50.876 | 54.275 | 66.383 | 82.182 | 102.765 |
| 57 | 50.876 | 54.267 | 66.354 | 82.110 | 102.435 |
| 58 | 50.875 | 54.258 | 66.323 | 82.039 | 102.103 |
| 59 | 50.875 | 54.250 | 66.297 | 81.979 | 101.776 |
| 60 | 50.874 | 54.244 | 66.278 | 81.932 | 101.460 |
| 61 | 50.874 | 54.240 | 66.268 | 81.901 | 101.157 |
| 62 | 50.874 | 54.237 | 66.266 | 81.889 | 100.870 |
| 63 | 50.874 | 54.235 | 66.266 | 81.880 | 100.574 |
| 64 | 50.874 | 54.233 | 66.266 | 81.875 | 100.268 |
| 65 | 50.874 | 54.230 | 66.268 | 81.871 | 99.950 |
| 66 | 50.874 | 54.227 | 66.270 | 81.871 | 99.618 |
| 67 | 50.874 | 54.224 | 66.273 | 81.873 | 99.273 |
| 68 | 50.874 | 54.221 | 66.277 | 81.878 | 98.911 |
| 69 | 50.874 | 54.218 | 66.282 | 81.886 | 98.533 |
| 70 | 50.874 | 54.214 | 66.289 | 81.896 | 98.135 |

FIGURE 6

PROCESS AND APPARATUS FOR THE DERIVATION OF ANNUITY RATES

This is a continuation in part of Ser. No. 08/847,106, filed May 1, 1997.

FIELD OF THE INVENTION

This invention relates generally to a process and apparatus for the determination of premium tables to produce annuity rates. In particular, this invention relates to a process and apparatus for deriving impairment based mortality tables with corresponding annuity rates used in personal pensions or life insurance contracts.

BACKGROUND OF THE INVENTION

The application of premium formulae to mortality rates is normal actuarial practice. Mortality tables are generally constructed based simply on the fact that the mortality, or risk of death, of individuals, both male and female, increases with age. Mortality tables are constructed based on the available research statistics relating to the type of population under measurement. Examples include tables of life assured mortality and tables of general population mortality.

These tables do not generally take into account specific life impairments in individuals. To do so demands a unique approach, recognizing that, for certain individuals, their impairments are such that the timing of their death is much more likely to be determined by that particular impairment rather than by the normal aging process as recognized by existing mortality tables.

The present invention provides a process and apparatus for the determination of premium tables to produce annuity rates, wherein specific life impairments are an implemented factor in the determination.

SUMMARY OF THE INVENTION

It is therefore an object of the present invention to provide a novel approach for constructing mortality tables on the basis of duration; that is, the expected life span of an individual with a particular impairment or other risk.

It is a further object of the present invention to provide a process and apparatus for compiling a mortality table which sets out a number representative of the expected mortality of a person, for each of a plurality of possible ages of that person and for each of a plurality of rating categories based on possible maximum probable lifetimes of that person dependent on the sex and medical condition of that person.

It is a further object of the present invention to provide a process comprising adjusting the corresponding contents of a conventional mortality table, based on normal population life expectancy, by factors, determined from a predetermined algorithm, which are a function of the predicted life span of the person at each of a plurality of ages up to the age of death, and an apparatus comprising a computer system through which this described process can be performed.

It is a further object of the present invention to provide a process and apparatus for deriving premium tables to produce annuity rates, the process comprising addressing the appropriate mortality table, compiled in accordance with the invention, to the age and rating category of a person to determine the number representative of expected mortality, and applying the number to conventional formulae for premium calculation, thereby providing rates specifically taking into account that person's individual life impairment, and the apparatus comprising a computer system through which the described process can be performed.

It is a further object of the present invention to provide individualized mortality tables for a variety of medical and/or high risk factor conditions.

It is a further object of the present invention to provide impairment based mortality table that have been corrected for medical and/or social advances.

It is a further object of the present invention to provide an annuity rate driven premium table.

BRIEF DESCRIPTION OF THE DRAWINGS

FIG. 3 depicts a constant extra deaths table.

FIG. 4 depicts a constant extra deaths table corrected for medical/social advances and prudence.

FIG. 5 depicts a single life annuity factors table for a non-guaranteed annuity.

FIG. 6 depicts a single life annuity factors table for an annuity guaranteed for five years.

DETAILED DESCRIPTION OF THE PREFERRED EMBODIMENT

Figure 1:
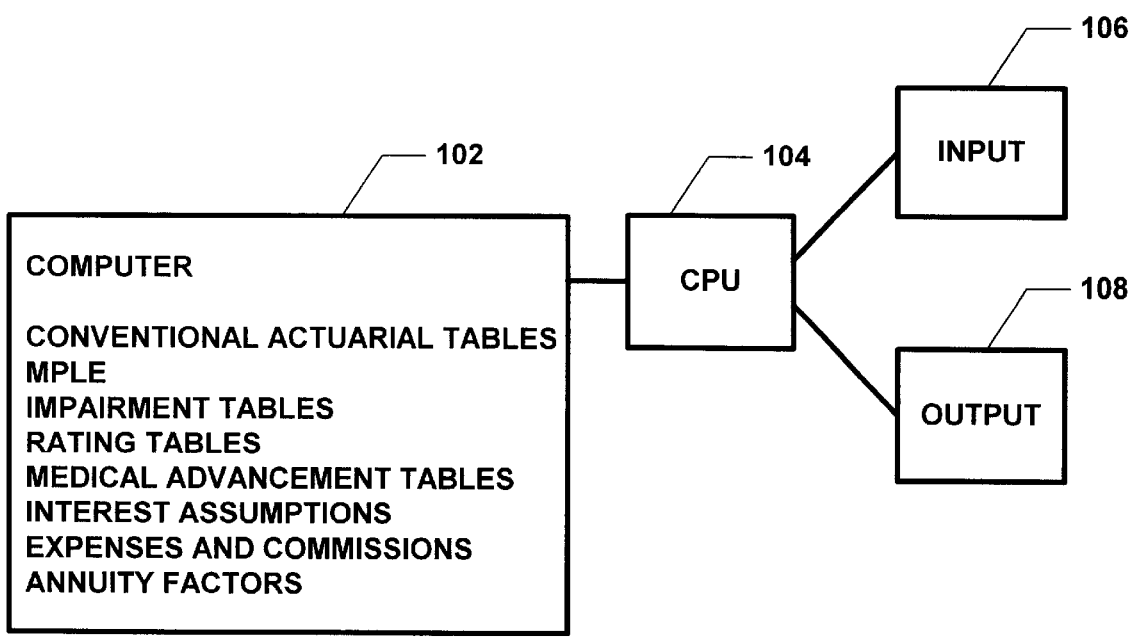
FIG. 1 is an overview of the system.

Referring to FIG. 1, an overview of the system is shown. The present invention is executable on computer 102 with operating system, that includes CPU 104, main storage, I/O resources, user interface or input means 106 and data output means 108. A standard IBM compatible PC or other computer comprising a CPU such as the Intel 80486, or pentium processor with RAM in which instructions may be stored together with hard disk storage for storage of the various databases of the present invention is a satisfactory platform on which to establish the system and method of the present invention. Data tables accessible through computer 102 include but are not limited to: conventional actuarial tables, maximum probable life expectancy (MPLE) for particular impairments and groups of impairments, rating tables, medical advancement tables, interest assumptions, expenses and commissions, and annuity factors. Programs stored in and accessible through computer 102 include but are not limited to rate adjustment means such as multiple of standard mortality, age rate-up and constant extra deaths. Examples of input means 106 include key board, mouse, touch-pad, voice recognition system and other means that allow choices on a screen to be selected. Examples of output means 108 include printer, video monitor, electronic transmission to a second source and other means that permit visual display or generation of hard copy output.

Figure 2:
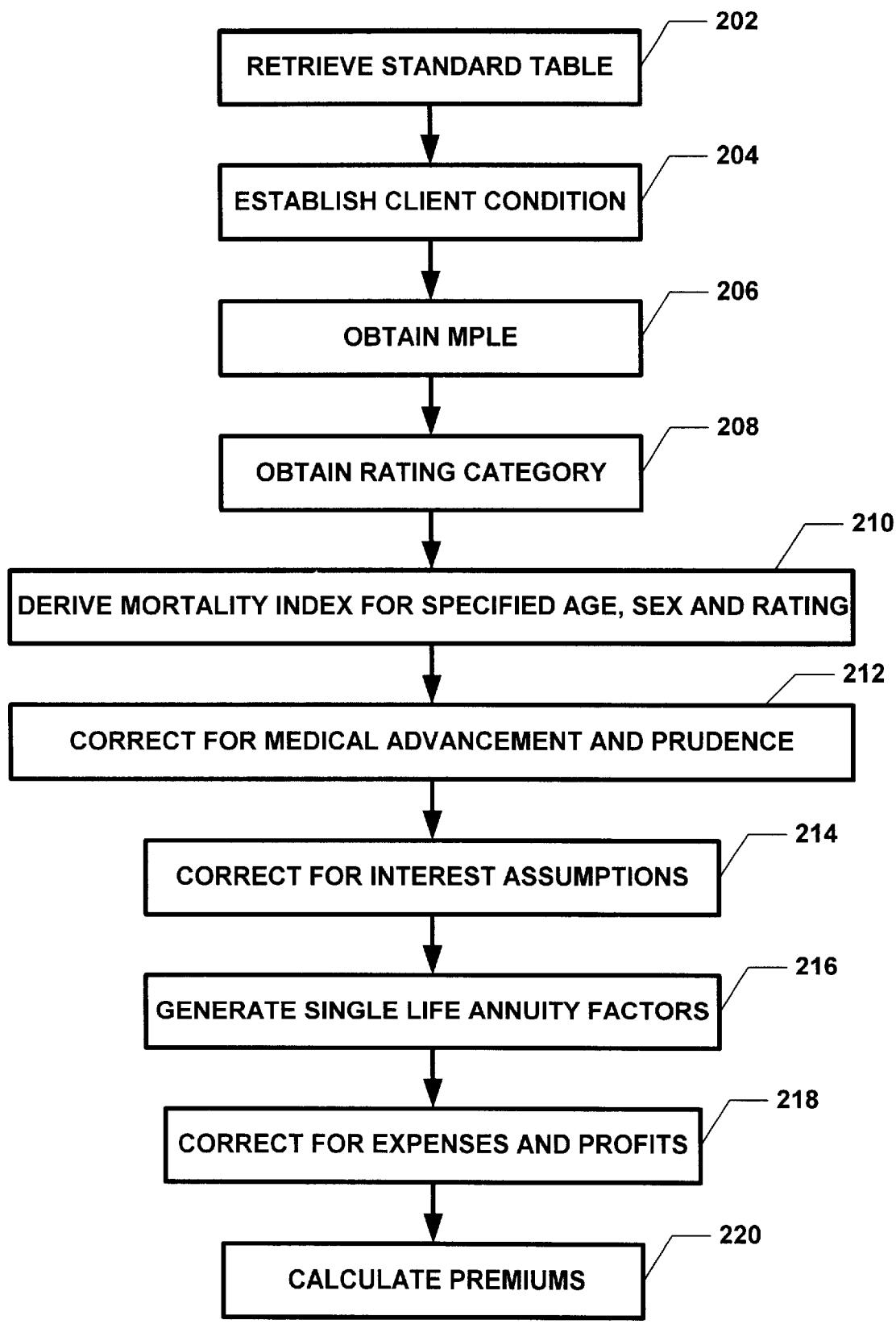
FIG. 2 is a flow chart depicting the process of the present invention.

Referring to FIG. 2, the data flow of the present invention is shown. A conventional actuarial table is first retrieved 202. The client's medical condition and/or propensity towards high risk activities is then established 204. His or her maximum probable life expectancy (MPLE) is then determined 206 and a rating category is assigned 208. The MPLE is the duration, from the time of underwriting, at which 90% of a cohort of identical lives would be expected to die. This 90% death expectation is not meant as a limitation but is only illustrative of this variable. Other expectation of death numbers may also be used. In making this determination, the continuation of current medical practice it is assumed. The MPLE can be based upon medical condition(s) or high risk behavior(s) such as dangerous sports or dangerous occupations. The MPLE table can be determined for each duration in a selected time frame for all ages, however, in the preferred embodiment of the present invention, the MPLE table is for the selected durations of two, five, ten, fifteen and twenty years only. The following example sets forth a representation of rating categories:

EXAMPLE ONE

| Rating Category | MPLE |
| --- | --- |
| A1 | Less than or equal to two years |
| A2 | Greater than 2 years less than or equal to 5 years |
| B | Greater than 5 years less than or equal to 10 years |
| C | Greater than 10 years less than or equal to 15 years |
| D | Greater than 15 years less than or equal to 20 years |
| D1 | Greater than 20 years but below average for age |
| D2 | Greater than 20 years and equal to or above average for age |

Each rating category is accorded a value representing the increased risk of death. Where K is the number of deaths per thousand, for a particular age and impairment, K is derived from the following formula for 1000 lives aged X:

$$D(x)+D(x+1)+\ldots D(x+n-1)+Kn=M(10),$$

where D(x) is the number of deaths for normal mortality at age x, D(x+1) is the number of deaths at age (x+1), and so on; and n is the age by which an individual has a M % (i.e.ø.M) chance of being dead. The preferable value for M in this equation is 90% although this is not meant as a limitation.

$$\text{Thus } K=\left((M\cdot 10)-\sum_{y=0}^{n-1}D(x+y)\right)/n.$$

The K value can therefore be constructed for all values of n from 1 to 25 (25 being the normal mortality for an individual at age x).

A mortality table is then derived, with listings for each combination of age, sex and rating category 210. The mortality index for a specific client is retrieved from this mortality table.

Varying means are available for adjusting a given standard table so that it reflects the rating category. Three such means include multiple of standard mortality, age rate-up and constant extra deaths. In the preferred embodiment the constant extra deaths method is used as its use leads to more conservative reserves than either the multiple of standard mortality or age rate-up, a situation needed if funds are to be available to pay claims.

The constant extra deaths (per thousand, per year), which, when applied to the underlying conventional actuarial table for the given age at entry and sex, will result in a ten percent survivorship at the upper limit of the rating category is determined. In the case of a male, aged 55, in the B rating category ($^B k_{55}^m$), such that $_{10}p^{m'}55=0.1$ we have:

$$_{10}p^{m'}55 = \prod_{i=1}^{10}\left(1 - q_{55+i}^m - \frac{^B k_{55}^m}{1000}\right)$$

with $q^m_y$ being the unadjusted mortality.

FIG. 3 sets forth an example table of constant extra deaths (per thousand, per year) for males ages 45 through 60 at rating categories A1 through D.

Returning to FIG. 2, calculated values are then corrected for medical and/or social advances and prudence 212. Regarding medical and/or social advances, percentage deductions are made from the constant extra deaths taken into account for premium calculation purposes. These deductions are dependent upon rating category. The reason for this is that it is extremely unlikely that medical advances or social advances will impact significantly upon the mortality experienced by individuals assessed as being in the A1 category, while an entire generation of medical and social advancement will be brought to bear on the lives of those included in the D category. Acknowledging that varying percentage deductions are within the scope of the present invention, the following example sets forth a representative application:

EXAMPLE TWO

| Rating Category | Percent Deduction |
| --- | --- |
| A1 | 0% |
| A2 | 5% |
| B | 10% |
| C | 20% |
| D | 40% |

A further explicit deduction of 15 percent from the constant extra deaths allowance across all rating categories is then made, again to ensure that system calculations result in appropriate available financial resources to meet obligations. This deduction is additive to that taken for medical and/or social advances, it is not multiplicative.

FIG. 4 sets forth an example table of constant extra deaths (per thousand, per year) for males ages 45 through 60 at rating categories A1 through D, wherein the values have been corrected for medical/social advances and prudence.

Returning to FIG. 2, a correction for interest assumptions is then made 214. This value can vary and is responsive to multiple factors. In a preferred embodiment, a uniform net assumption of a selected percent per annum allows an entity to seek its competitive advantage and its profits from the selection and rating of its life risks, rather than from making an investment spread. This approach provides an investment assumption that is both straightforward and sufficiently conservative to avoid the need for adjustment in response to each shift in the shape or level of the yield curve. However, in other circumstances alternatives such as a separate interest rate assumption for each rating category, may be preferred. For exemplary purposes, a uniform net assumption of 7.0 percent per year will be used.

Once the mortality and interest bases are specified, tables of single life annuity factors for each age at entry, and each rating category for both sexes can be produced 216. FIG. 5 depicts such a table for a non-guaranteed annuity. FIG. 6 depicts such a table for an annuity guaranteed for five years. The factors listed in FIGS. 5 and 6 set forth the value of a male's life annuity of one pound Sterling per month at 7.0 percent per annum and shows a preferred embodiment using monthly in arrear non-escalating mode of payment.

Returning to FIG. 2, it is also desired to correct for expenses and profits 218 associated with brokering and marketing. For example, the user may wish to include expense commission and profit loadings such as brokerage, marketing allowance, initial expenses, profit loading and payment expenses in the gross premium bases. In a preferred embodiment prices and reserves for expenses will be set on the pessimistic assumption that sub-economic volumes will be written and that business will then be run off. In this anticipated scenario, the expense allowance is expected to be a substantial source of profit. An example of loadings used in such a scenario is as follows:

| | |
|---|---|
| Brokerage: | 1.50% of purchase price |
| Marketing allowance | 2.00% of purchase price |
| Initial expenses | 0.75% of purchase price |
| Profit loading | 0.75% of purchase price |
| Payment expenses | 0.25% of purchase price per annum |

Using these values gives rise to the following gross premium formula which can be used to calculate premiums 220: Rate of annuity per month=

$$\text{Purchase price} \cdot \left( \frac{0.95}{\text{annuity factor}} - \frac{1}{4800} \right)$$

Example three sets forth a sample quotation for a male aged 60 using the aforementioned premium formula.

EXAMPLE 3

| Level Annuity per Month in Arrears per £ 100000 Single Premium | | | | | |
|---|---|---|---|---|---|
| G'tee | A1 | A2 | B | C | D |
| 0 | 7649.63 | 3320.32 | 1842.22 | 1287.64 | 963.43 |
| 5 | 1846.51 | 1730.51 | 1412.52 | 1138.67 | 915.50 |

Although the process and apparatus of the present invention has been described for purpose of illustration, it is understood that such detail is solely for that purpose, and variations can be made therein by those skilled in the art without departing from the spirit and scope of the invention. The process and apparatus of the present invention is defined by the following claims.

What is claimed is:

1. A data processing system for deriving impairment based mortality tables comprising:
    a central processing unit (CPU) having memory;
    storage connected to the CPU for storing actuarial tables, maximum probable life expectancy data, and rating tables;
    data input means connected to the CPU for inputting client information;
    data output means connected to the CPU for displaying information; and
    logic means stored in the CPU memory for calculating client rating categories, wherein the logic means further comprises logic for calculating and assigning a value to the client rating category and wherein the logic comprises the formula:

$$K = \left( (M \cdot 10) - \sum_{y=0}^{y=n-1} D(x+y) \right) / n$$

where K is the number of deaths per thousand, at age x, where D(x+y) is the number of deaths at age x+y, where y is the age increments added to x and with n equal to the age where an individual has an M percent chance of mortality;
    a mortality index based upon age, sex and rating category;
    a means for generating annuity rates based upon the impairment based mortality tables; and
    data output means connected to the CPU for outputting annuity rates.

2. A data processing system as in claim 1, further comprising:
    factors relating to medical advancement stored in the storage.

3. A data processing system as in claim 2, further comprising:
    prudence correction factors stored in the storage.

4. A data processing system as in claim 3, further comprising:
    interest tables stored in the storage.

5. A data processing system as in claim 4, further comprising:
    expenses and commissions tables stored in the storage.

6. A data processing system as in claim 5, further comprising:
    annuity factors stored in the storage.

7. A computer implemented process for deriving impairment based mortality tables comprising:
    storing at least one actuarial table, at least one maximum probable life expectancy data point and at least one impairment rating table;
    inputting client information;
    calculating client rating categories, and mortality index based upon the maximum probable life expectancy and rating table, where calculating client rating category further comprises:
        calculating and assigning a value to the client rating category, where the value represents an increased risk of death and where assigning a value to the client rating category further comprises implementing the formula:

$$K = \left( (M \cdot 10) - \sum_{y=0}^{y=n-1} D(x+y) \right) / n$$

where K is the number of deaths per thousand, at age x, where D(x+y) is the number of deaths at age x+y, where y is the age increments added to x and with n equal to the age where an individual has an M percent chance of mortality;
    generating annuity rates and
    outputting the annuity rates through a data output means.

8. A computer implemented process for deriving impairment based mortality tables as in claim 7 further comprising:
storing a medical and social advancement table.

9. A computer implemented process for deriving impairment based mortality tables as in claim 8 further comprising:
    correcting for medical and social advances.

10. A computer implemented process for deriving impairment based mortality tables as in claim 9 further comprising:
    storing prudence correction factors.

11. A computer implemented process for deriving impairment based mortality tables as in claim 10 further comprising:
    correcting for prudence.

12. A computer implemented process for deriving impairment based mortality tables as in claim 11 further comprising:
    storing at least one interest table comprising interest rates.

13. A computer implemented process for deriving impairment based mortality tables as in claim 12 further comprising:
correcting for interest rates.

14. A computer implemented process for deriving impairment based mortality tables as in claim 13, further comprising:
storing at least one expense table and at least one commission table.

15. A computer implemented process for deriving impairment based mortality tables as in claim 14 further comprising:
correcting for expenses and commissions.

16. A computer implemented process for deriving impairment based mortality tables as in claim 15 further comprising:
storing at least one annuity factor table.

17. A computer implemented process for deriving impairment based mortality tables as in claim 16 further comprising:
correcting for annuity factors.

18. A computer implemented process for deriving impairment based mortality tables as in claim 17 further comprising:
determining tables of single life annuity factors based upon the data stored in the actuarial table, the maximum probable life expectancy data table, the impairment rating table, the medical and social advancement table, the prudence correction factors, and the interest table.

19. A computer implemented process for deriving impairment based mortality tables as in claim 18 further comprising:
determining premium values based upon the data stored in the actuarial table, the maximum probable life expectancy data table, the impairment rating table, the medical and social advancement table, the prudence correction factors, the interest table the expense table and the commission table.

20. A computer implemented process for deriving impairment based mortality tables as in claim 19, where calculating client rating category further comprises:
calculating and assigning a value to the client rating category, where the value represents an increased risk of death.

21. A computer implemented process for deriving impairment based mortality tables as in claim 14, where deriving a mortality table adjusted for rating categories further comprises implementing constant extra deaths method.

22. The computer data processing system of claim 1 where the value of M is about 90%.

23. The computer implemented process for deriving impairment based mortality tables of claim 7 where in the value of M is about 90%.

24. A computer implemented process for deriving impairment based mortality tables as in claim 7, where deriving a mortality table adjusted for rating categories further comprises implementing constant extra deaths method.

* * * * *